US011815135B2

(12) United States Patent
Mazzarini et al.

(10) Patent No.: US 11,815,135 B2
(45) Date of Patent: Nov. 14, 2023

(54) FRICTION CLUTCH FOR MOTOR VEHICLES

(71) Applicant: RAICAM DRIVELINE S.R.L., Mondovi (IT)

(72) Inventors: Nicola Mazzarini, Jesi (IT); Amedeo Russo, Jesi (IT)

(73) Assignee: RAICAM DRIVELINE S.R.L., Mondovì (IT)

( * ) Notice: Subject to any disclaimer, the term of this patent is extended or adjusted under 35 U.S.C. 154(b) by 0 days.

(21) Appl. No.: 17/738,395

(22) Filed: May 6, 2022

(65) Prior Publication Data

US 2022/0356911 A1 Nov. 10, 2022

(30) Foreign Application Priority Data

May 7, 2021 (IT) .......................... 102021000011735

(51) Int. Cl.
*F16D 13/58* (2006.01)
*F16D 13/71* (2006.01)
*F16D 13/75* (2006.01)

(52) U.S. Cl.
CPC ........... *F16D 13/585* (2013.01); *F16D 13/71* (2013.01); *F16D 13/757* (2013.01); *F16D 2300/26* (2013.01)

(58) Field of Classification Search
CPC ...... F16D 13/583; F16D 13/585; F16D 13/71; F16D 2300/26
USPC ....................................................... 192/89.23
See application file for complete search history.

(56) References Cited

U.S. PATENT DOCUMENTS

| 3,811,544 | A  | * | 5/1974  | Maucher ............... F16D 13/585 192/89.1 |
| 4,491,211 | A  | * | 1/1985  | Steeg .................... F16D 13/583 192/70.27 |
| 2010/0288596 | A1 | * | 11/2010 | Okazaki .................. F16D 13/70 192/70.17 |

FOREIGN PATENT DOCUMENTS

| DE | 112007000229 T5 | 12/2008 |
| EP | 2048397 A1 | 4/2009 |
| FR | 2914032 A1 | 9/2008 |

(Continued)

OTHER PUBLICATIONS

Italian Search Report for IT Patent Application No. 102021000011735, dated Dec. 22, 2021, Munich, DE, 7 pages.

*Primary Examiner* — Richard M Lorence
(74) *Attorney, Agent, or Firm* — Armstrong Teasdale LLP

(57) ABSTRACT

A friction clutch mechanism includes a diaphragm spring, a pressure plate having a peripheral fulcrum acting against a first face of the diaphragm spring, and a pair of axially opposed intermediate fulcrums supported by a clutch cover and acting on the opposite faces of the diaphragm spring along a radially intermediate portion thereof. The friction clutch mechanism has an additional elastic element, operatively associated with a first intermediate fulcrum of the pair of axially opposed intermediate fulcrums, and axially and elastically compressible in response to a deflection of the diaphragm spring towards an open friction condition. The additional elastic element has a radially innermost annular portion resting on one or more bearing surfaces supported by the clutch cover, and a radially outermost annular portion that cantilevers and has a protrusion circumferentially extended and axially projecting towards the first face of the diaphragm spring to serve as the first intermediate fulcrum.

7 Claims, 9 Drawing Sheets

(56) References Cited

FOREIGN PATENT DOCUMENTS

GB 2268553 A 1/1994

* cited by examiner

FRICTION CLUTCH FOR MOTOR VEHICLES

CROSS-REFERENCE TO RELATED APPLICATION

This application claims priority to Italian Patent Application No. 102021000011735, filed on May 7, 2021, the contents of which are incorporated by reference in their entirety.

FIELD OF THE INVENTION

The present invention relates to an improved modulation friction clutch. The friction clutch is applicable to transmission systems of motor vehicles (thermal and/or electric).

BACKGROUND OF THE INVENTION

In a conventional diaphragm spring-actuated clutch, the law describing the trend of the torque transmitted with the clutch disengagement stroke is called transmissibility and depends on a number of main factors, such as:
- the axial stiffness of the disc pack (or law of pack compression force vs. deflection);
- the geometric leverage ratio of the clutch mechanism, in particular the ratio between the actuation diameter of the diaphragm spring and the diameter of the pressure plate fulcrum;
- the axial stiffness of the clutch mechanism;
- the characteristic load curve as a function of diaphragm spring stroke;
- the friction coefficient of the disc pack;
- the internal and external diameters of the disc pack; and
- the number of friction surfaces, i.e. the number of interface surfaces between the flywheel, the disc pack and the pressure plate (or the intermediate plates in the case of multi plate clutches).

In FIG. 1 of the accompanying drawings, a simplified geometric diagram of a conventional friction clutch is illustrated, comprising a diaphragm spring 11, through which the friction engagement is actuated by a release force F, a pressure plate 14 carrying a peripheral or radially outer fulcrum 16, a pair of opposing intermediate fulcrums 12, 13 supported by a clutch cover, and a disc pack 17 (or single disc, in a single disc clutch), acting underneath the pressure plate. The friction clutch is actuated by means of the diaphragm spring, by depression of its radially internal part. As known, the clutch is disengaged when the release force causes the diaphragm spring to rotate on the intermediate fulcrums, releasing the disc pack and interrupting torque transmission.

The graph in FIG. 2 shows the torque transmissibility curve, i.e. the trend of the transmitted torque T, as a function of the disengagement stroke R: the torque varies between a maximum torque value, transmitted by the fully engaged clutch, and a value of torque transmitted of almost zero when the clutch is free or disengaged, with the pressure plate detached from the disc. The typical shape of the transmissibility curve, indicated by C in FIG. 2, is determined by the parameters listed above.

In some applications it is necessary to modify the transmissibility curve shape to obtain a curve as indicated by D in FIG. 2, with a greater modulation of the transmitted torque, i.e. less torque variation per disengagement stroke unit. This is often required to improve the controllability of the clutch, particularly when it is actuated by electro-mechanical or electro-hydraulic systems. Having a very "steep" transmission curve during clutch re-engagement may lead to control problems, generating side effects such as tearing, jerking, engine shutdown, etc.

DE 11 2007 000229 T5 discloses a friction clutch mechanism of the above-mentioned type. Other friction clutch mechanisms are disclosed by FR 2 914 032 A1, EP 2 048 397 A1 and GB 2 268 553 A.

SUMMARY OF THE INVENTION

In light of the prior art, a primary aim is to improve the controllability of the clutch, both in manually actuated systems, and especially in electro-mechanically or electro-hydraulically actuated systems. In particular, it is desirable to change the trend of the transmission curve, either in its entirety or only in part. More in detail, in certain cases it is desired to make the transmissibility curve less steep, that is, smoother and more gradual in the part of the curve which goes towards the maximum torque, transmitted when the clutch is fully engaged.

In summary, a friction clutch mechanism according to the present invention comprises at least one additional axially compressible spring element operatively associated with the intermediate fulcrum located on the side of the pressure plate. The additional spring element is configured and arranged to be elastically and axially compressed in response to a deflection of the diaphragm spring towards an open friction condition. The additional spring element comprises a single element having an annular disc shape forming a radially innermost annular portion and a radially outermost annular portion. The radially innermost annular portion has a flat annular base that rests on one or more bearing surfaces supported directly or indirectly by a clutch cover and facing the cover and the first face of the diaphragm spring. The radially outermost annular portion cantilevers in a radially outward direction from the radially innermost annular portion, and has at least one circumferentially extended protrusion, axially projecting towards the first face of the diaphragm spring to serve as a first intermediate fulcrum.

BRIEF DESCRIPTION OF THE FIGURES

In order that the present invention may be clearly understood, some preferred embodiments of the invention will now be described, given by way of example, with reference to the appended drawings, in which.

DETAILED DESCRIPTION

Figure 3:
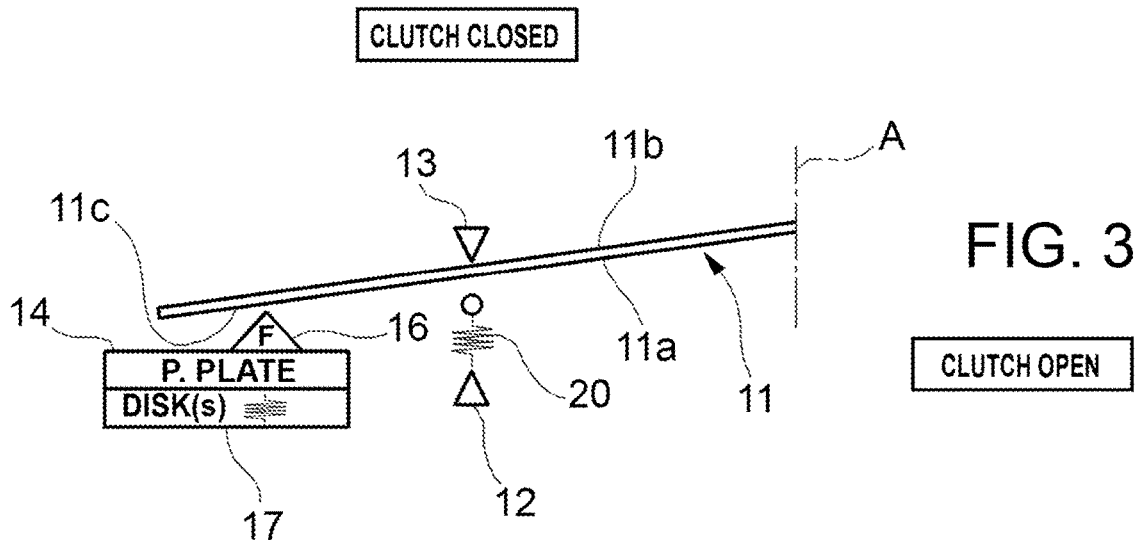
FIGS. 3 and 4 are schematic representations of the operation of a friction clutch mechanism according to the present invention, under two different operating conditions, with the clutch closed and with the clutch open, respectively.

Referring now to FIG. 3, the overall geometric scheme of a friction clutch according to the present invention does not differ appreciably from that of a conventional clutch. A friction clutch comprises a diaphragm spring 11, through which the friction clutch is actuated by a release force F (FIG. 4), a pressure plate 14 carrying a peripheral or radially outer fulcrum 16, a pair of opposing intermediate fulcrums 12, 13, supported by a clutch cover 18 (FIG. 5), and a disc pack 17 (or single disc, in a single disc clutch), acting on the pressure plate 14.

Figure 6:
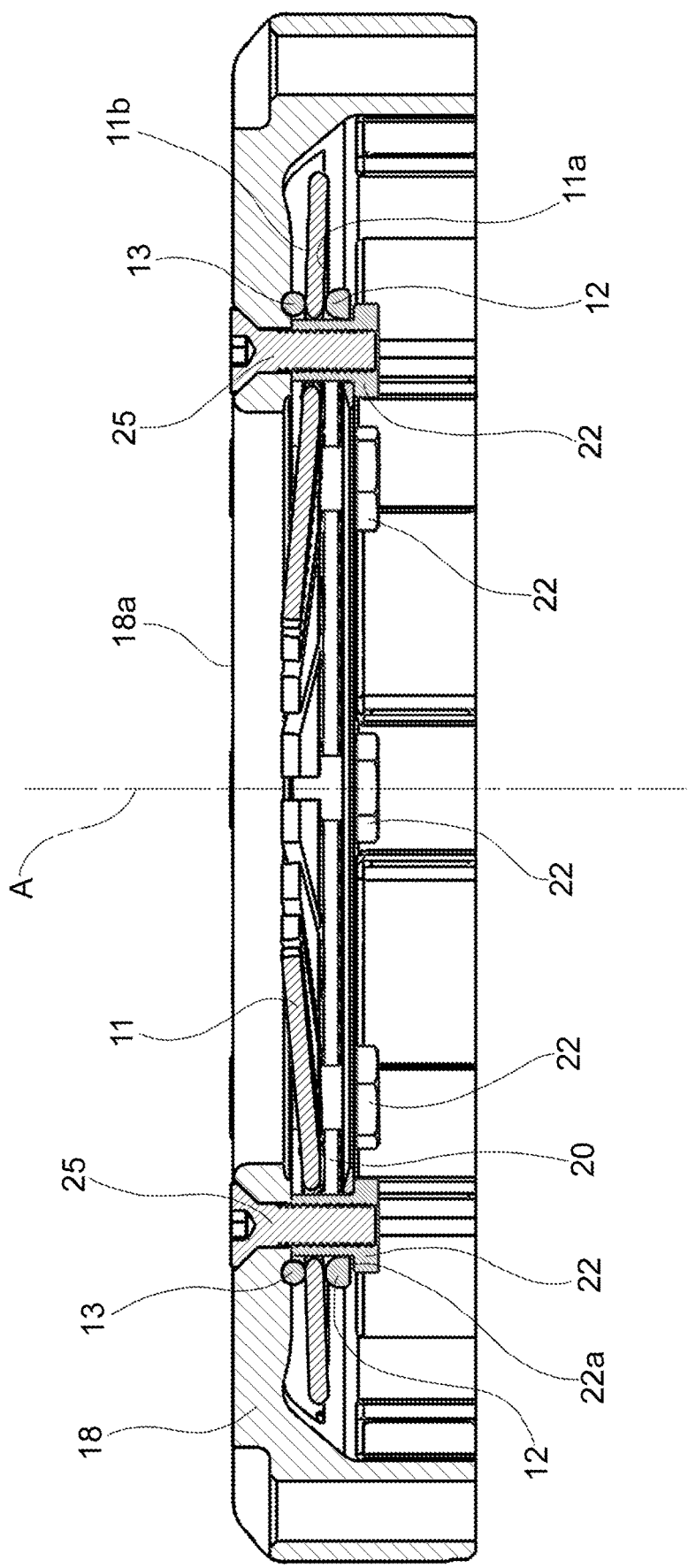
FIG. 6 is a sectional view of the mechanism of FIG. 5.

The friction clutch defines a central actuation axis A (FIG. 6). In this context, terms and expressions indicating positions and orientations, such as "axial", "radial", "peripheral", "circumferential", are to be interpreted with reference to the central axis A, unless otherwise noted.

The diaphragm spring 11 has a first face 11a and a second face 11b opposite the first face. The peripheral fulcrum 16 on the pressure plate 14 acts against the first face 11a of the diaphragm spring 11, along a peripheral or radially outer portion 11c thereof intermediate fulcrums 12, 13 are adapted to cooperate with the diaphragm spring 11 in a radially intermediate area thereof. A first intermediate fulcrum 12 may act against the first face 11a of the diaphragm spring, whereas the second intermediate fulcrum 13 may act against the second face 11b of the diaphragm spring. According to an aspect of the present invention, the transmissibility curve shape is modified, relative to the prior art, by the introduction of an additional elastic element 20, integrated or added to the first intermediate fulcrum of the clutch mechanism.

FIG. 3 schematically illustrates a clutch mechanism, in the closed clutch condition. A diaphragm spring 11 is engaged between a first intermediate fulcrum 12 of the clutch mechanism and a second intermediate fulcrum 13. The diaphragm spring 11 rests along a peripheral portion 11c thereof on the fulcrum 16 integral with the pressure plate 14.

Figure 1:
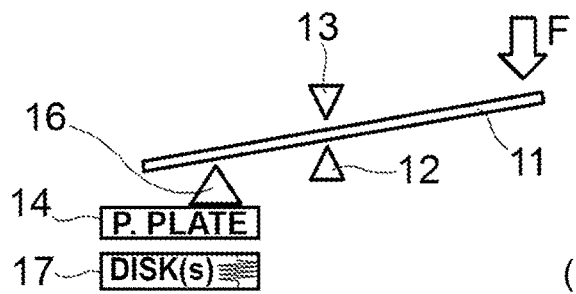
FIG. 1 is a schematic representation of a conventional friction clutch mechanism.
Figure 2:
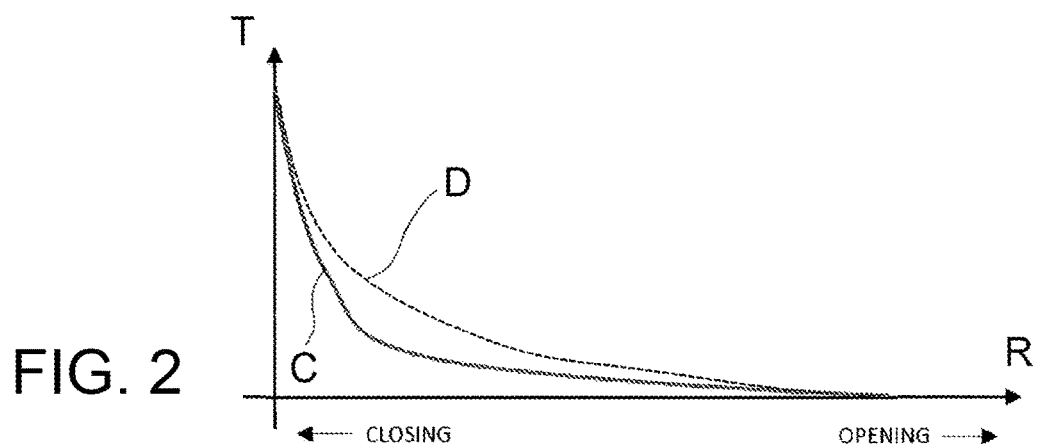
FIG. 2 is a diagram showing the torque transmission curve in a friction clutch as a function of the release stroke.

According to an embodiment, an additional elastic element 20 is added to the first intermediate fulcrum 12 to modify a specific part of the transmissibility curve. The additional elastic element 20 introduces an additional elastic compliant element into the friction clutch mechanism, which allows the right part of the transmissibility curve D to be modified, by rounding or smoothing the knee of the curve, towards the clutch opening (towards the right in the diagram of FIG. 2).

In the embodiment schematically illustrated in FIG. 3, the additional elastic element 20 is interposed between the first intermediate fulcrum 12 and the diaphragm spring 11. When the clutch is in the engaged condition (FIG. 3), and for the first part of the disengagement stroke (represented by the left section of the curve D in the diagram of FIG. 2), the diaphragm spring 11 engages the second intermediate fulcrum 13 in a thrust relationship.

Figure 4:
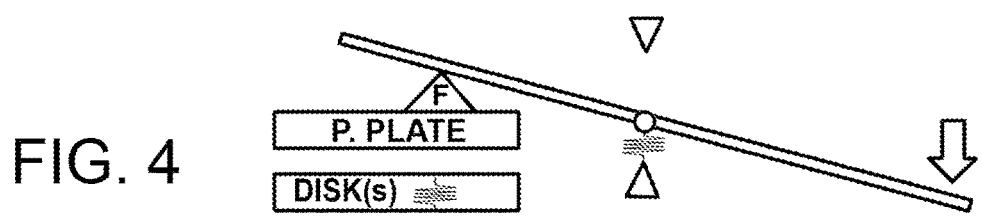

During the last part of the disengagement stroke of the clutch (right section of the curve D in FIG. 2), the diaphragm spring 11 comes into contact with the first intermediate fulcrum 12 (FIG. 4). The additional elastic element 20, being an elastically deformable element, which is compressed by the diaphragm spring, provides an equivalent axial stiffness which is less than that of a conventional clutch mechanism having rigid intermediate fulcrums. This results in a greater modulation of the transmitted torque, due to the greater disengagement stroke required, as a result of the elastic deformation of the additional elastic element 20.

FIGS. 5-8 illustrate an embodiment according to which the additional elastic element 20 is made as a single element in the form of an annular disc incorporating the functions of a supplementary elastic element and a first intermediate fulcrum 12 adapted for resting against the first face 11a of the diaphragm spring, facing the pressure plate 14.

The stationary clutch cover 18 has an outer surface 18a and an opposite inner surface 18b wherein a circular groove 18c is formed which holds a component 13, in this example toroidal in shape, that protrudes axially from the clutch cover towards the face 11b of the diaphragm spring and forms the second intermediate fulcrum 13, fixed with respect to the clutch cover 18.

The pressure plate 14 acts axially via the peripheral fulcrum 16 against the peripheral part 11c of the first face 11a of the diaphragm spring 11, in a radially outer position with respect to the intermediate fulcrums 12, 13.

Figure 5:
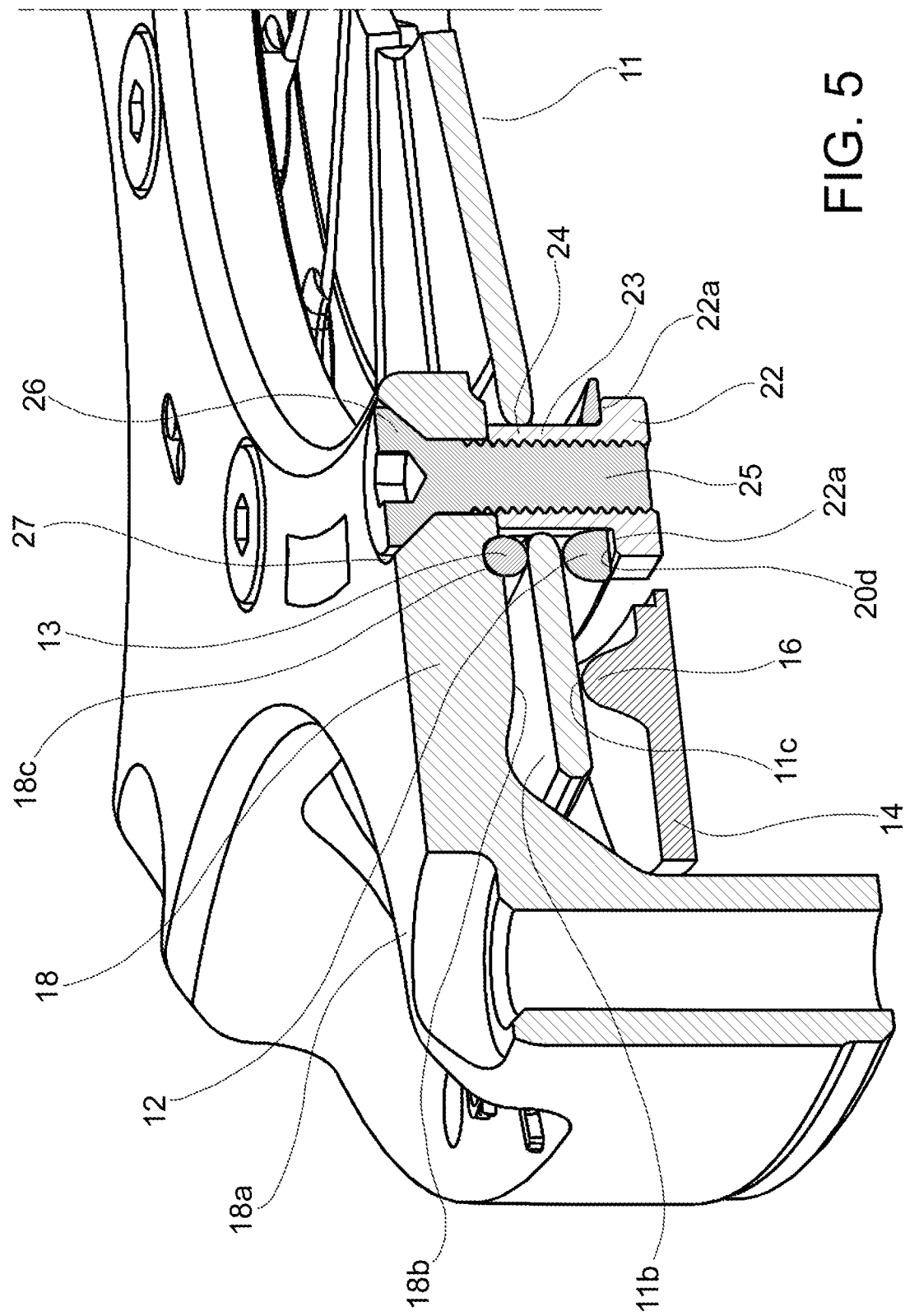
FIG. 5 is a perspective view in partial cutaway of a friction clutch mechanism according to a first embodiment of the present invention.
Figure 7:
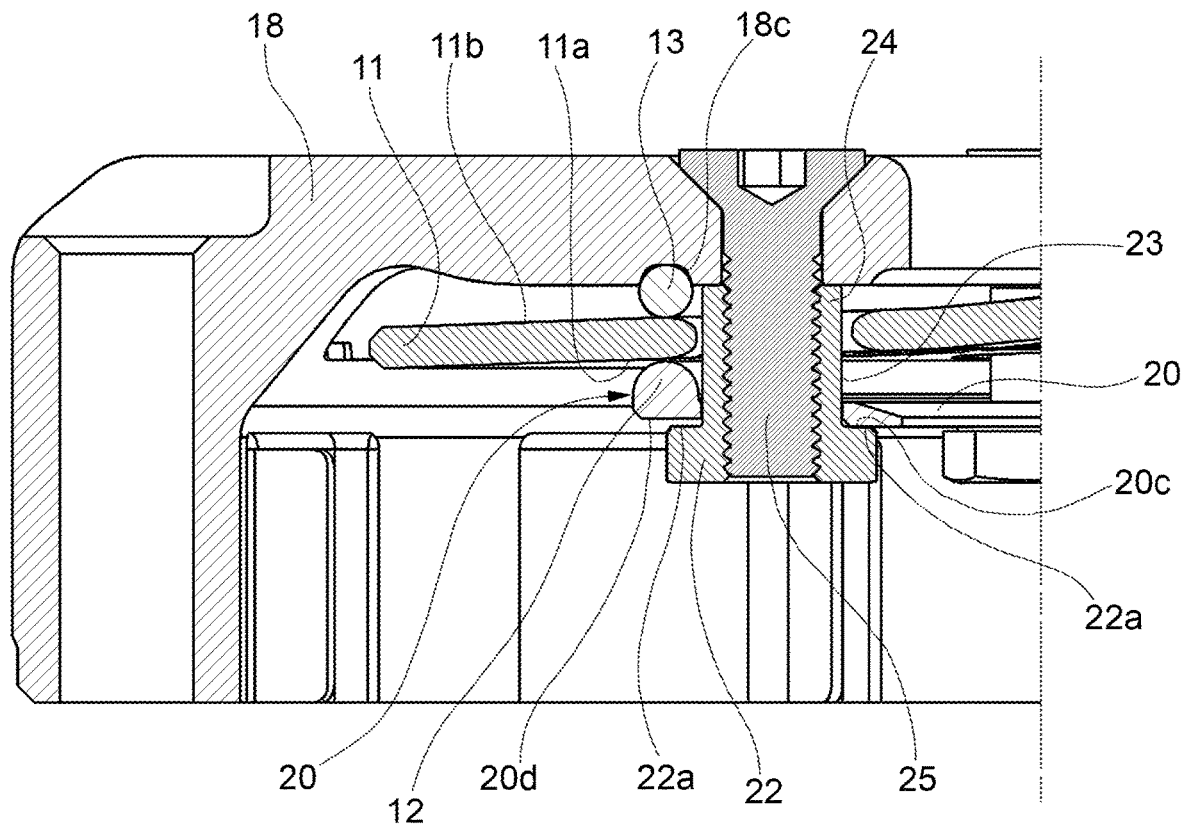
FIG. 7 is an enlarged view of part of FIG. 6.

According to the embodiment illustrated in FIGS. 5-7, the additional elastic element 20 may be supported by a plurality of threaded support elements mounted through the clutch cover at circumferentially spaced positions. In the example of FIGS. 5-7, the additional elastic element 20 is supported by a plurality of flanges 22 (only one of which is visible in FIG. 5) of corresponding threaded bushings 23 each having a tubular portion 24 screwed onto a screw 25 inserted through the clutch cover 18.

In the example of FIGS. 5-7, the screws 25 have a head 26 which may be of conical form received in a corresponding conical seat 27 obtained in the upper outer surface 18a of the clutch cover 18. In this example, the screw heads 26 do not protrude externally from the outer surface 18a of the clutch cover.

According to the embodiment illustrated in FIGS. 5-8, the additional elastic element 20 forms a radially innermost annular portion 20a and a radially outermost annular portion 20b.

The radially innermost annular portion 20a has a flat annular base 20c which rests on one or more bearing surfaces 22a presented by the flanges 22 and thus supported, in this example indirectly, by the clutch cover 18. The bearing surfaces 22a face the clutch cover 18 and the first face 11a of the diaphragm spring.

The radially outermost annular portion 20b cantilevers in a radially outward direction from the radially innermost annular portion 20a, and has a circumferentially extended bead 12 axially protruding towards the first face 11a of the diaphragm spring acting as an intermediate fulcrum.

In the embodiment shown in FIGS. 5-8, the bead 12 extends circumferentially with continuity along the radially outermost annular portion 20b of the additional elastic element 20.

According to the embodiment illustrated in FIGS. 5-7, the radially outermost annular portion 20b may have an annular base surface 20d axially opposite the bead 12 and axially spaced from the one or more bearing surfaces 22a.

Figure 8:
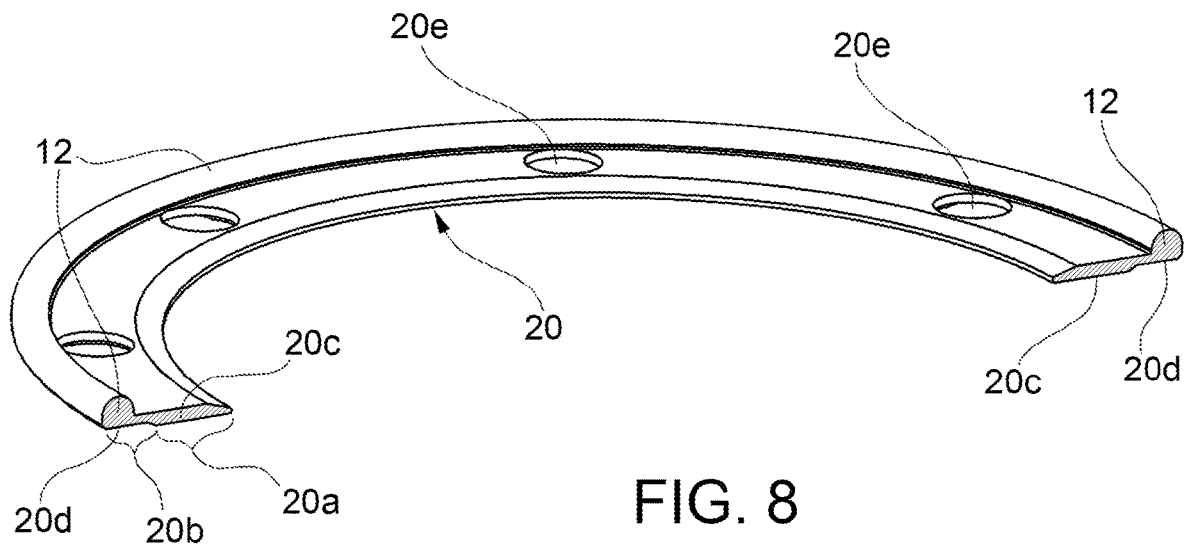
FIG. 8 is a perspective view of a component of the mechanism of FIG. 7.

The additional elastic element 20 may have a plurality of axial holes 20e circumferentially spaced, preferably equally spaced, for passing the bushings 23 (FIG. 8).

Figure 9:
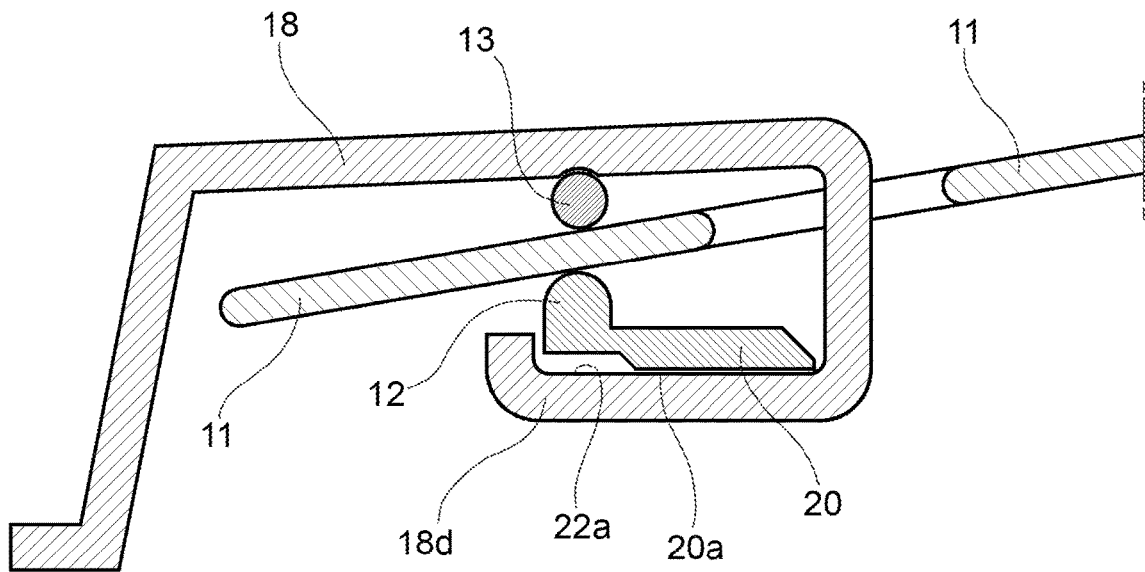
FIG. 9 is a sectional view of a friction clutch mechanism according to a second embodiment of the present invention.

In the embodiment of FIG. 9, the bearing surface 22a for the additional elastic element 20 is presented by a shelf-shaped extension 18d formed as a single piece by the clutch cover 18.

In the clutch actuation movement, the diaphragm spring 11 flexes (downwards in FIG. 6) and, by flexing, axially compresses the additional elastic element 20 by elastically flexing the radially outermost annular portion 20b with respect to the radially innermost annular portion 20a which is fixedly supported by the bearing surfaces 22a.

Figure 10:
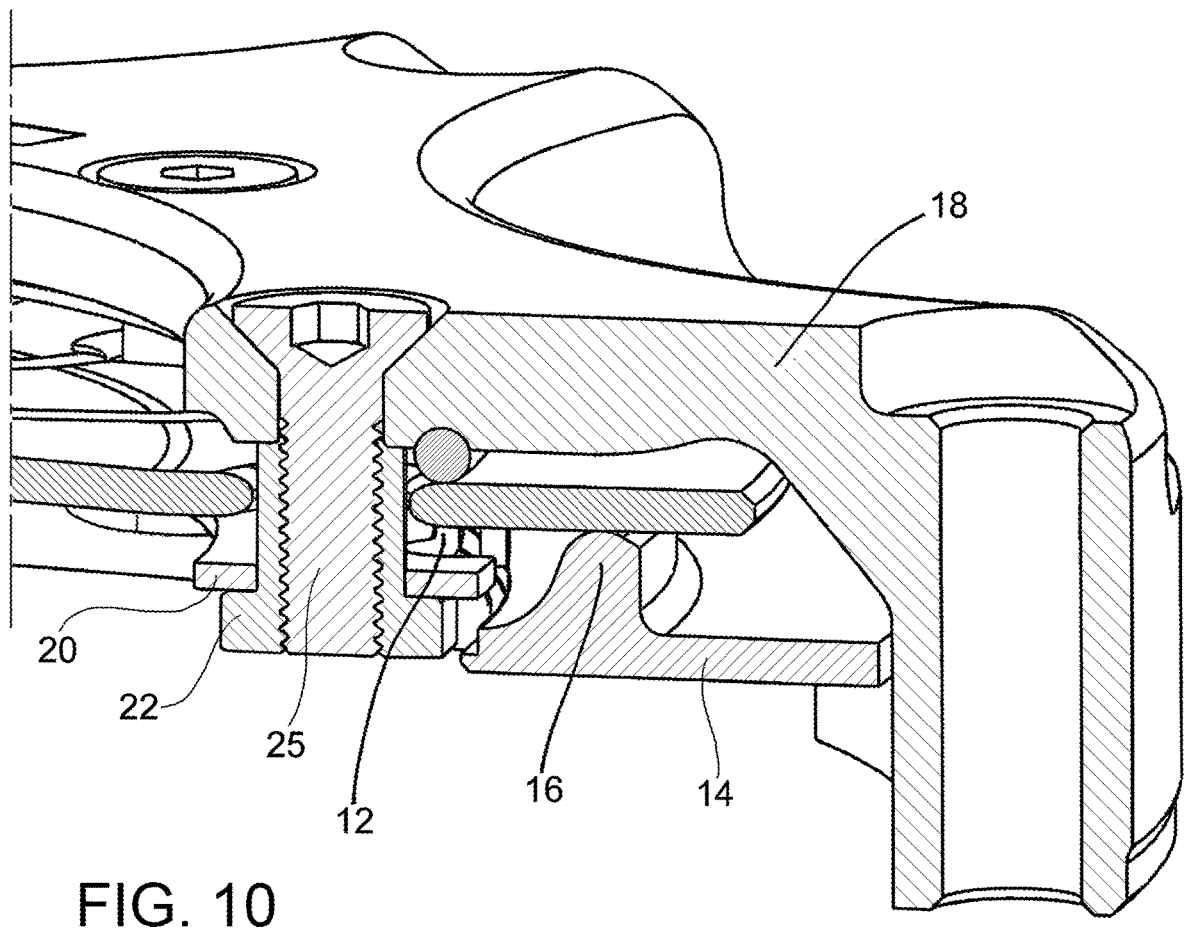
FIG. 10 is a perspective view in partial cutaway of a friction clutch mechanism according to a third embodiment of the present invention.
Figure 11:
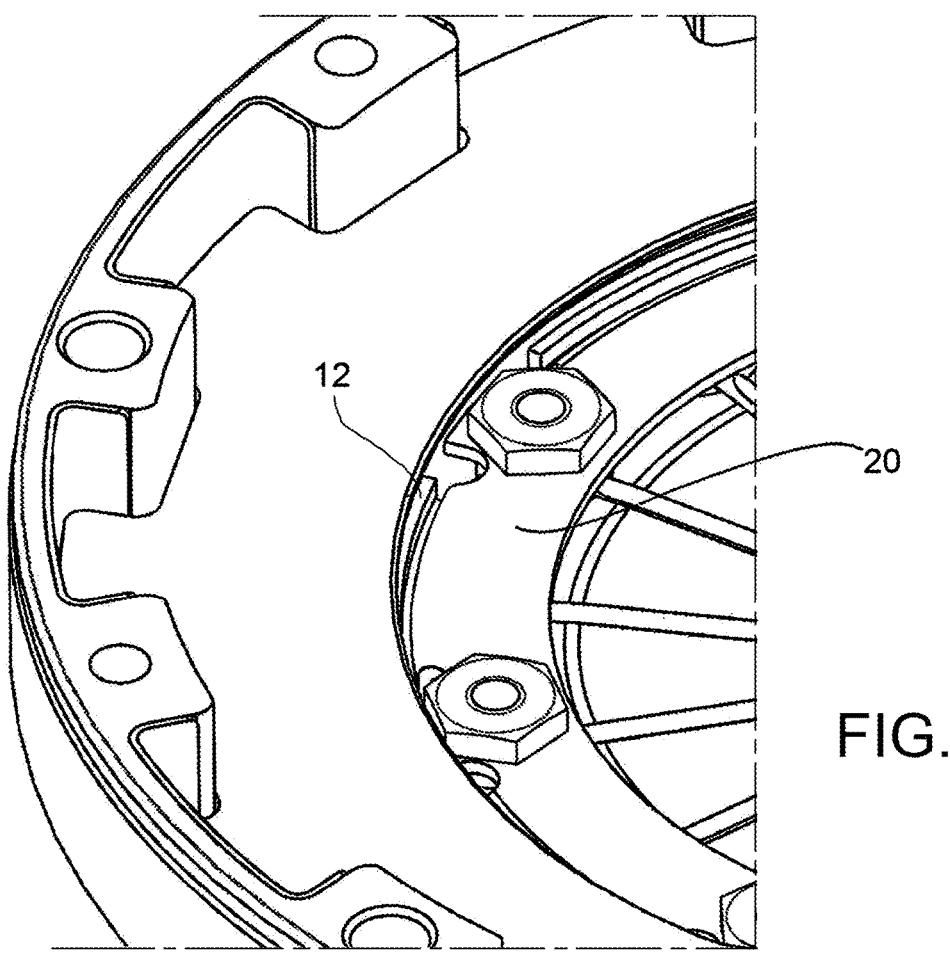
FIG. 11 is a partial perspective view of the mechanism of FIG. 10.
Figure 12:
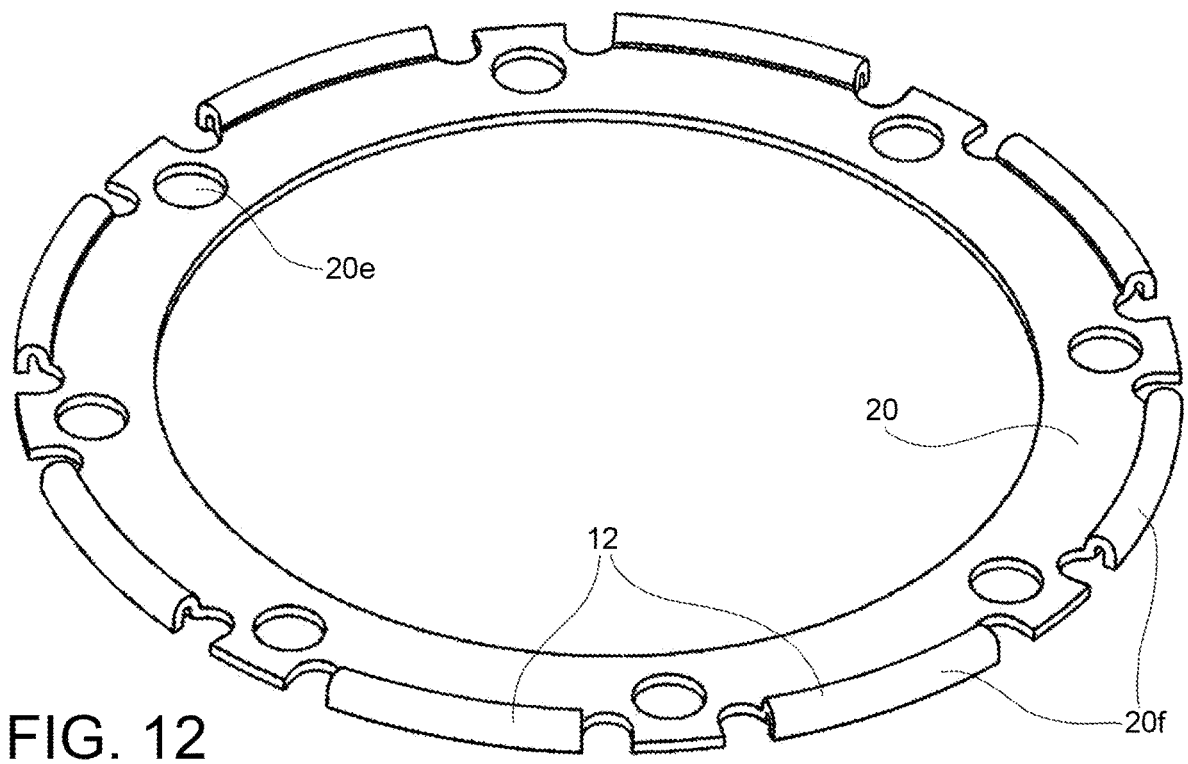
FIG. 12 is a perspective view of a component of the mechanism of FIGS. 10 and 11.

In accordance with the embodiment illustrated in FIGS. 10-12, the bead 12 extends circumferentially discontinuously along the radially outermost annular portion 20b of the additional elastic element 20, forming a plurality of radially outermost elastically flexible, angularly spaced tongues 20f or protrusions.

The bead 12 at the free end of the flexible tongues 20f protrudes axially towards the diaphragm spring 11 acting as a first intermediate fulcrum. The diaphragm spring 11, by flexing downwards against the beads 12, flexes the tongues 20f in respective axial planes.

Figure 13:
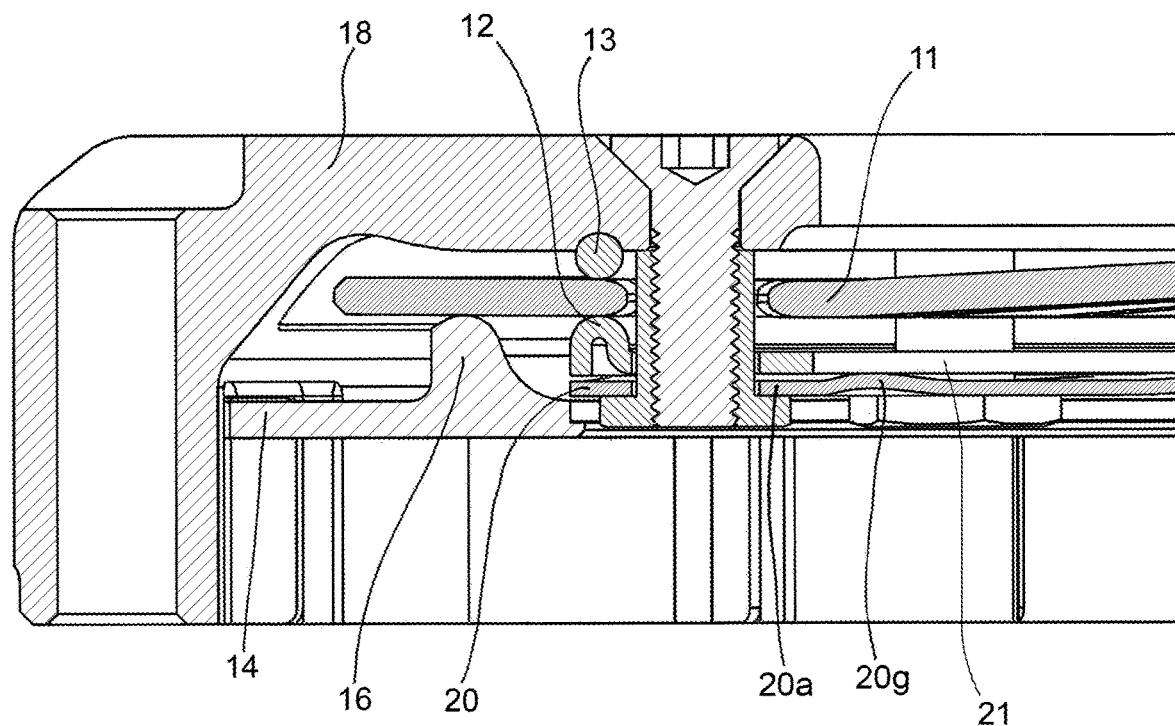
FIG. 13 is a sectional view of a friction clutch mechanism according to a fourth embodiment of the present invention.
Figure 14:
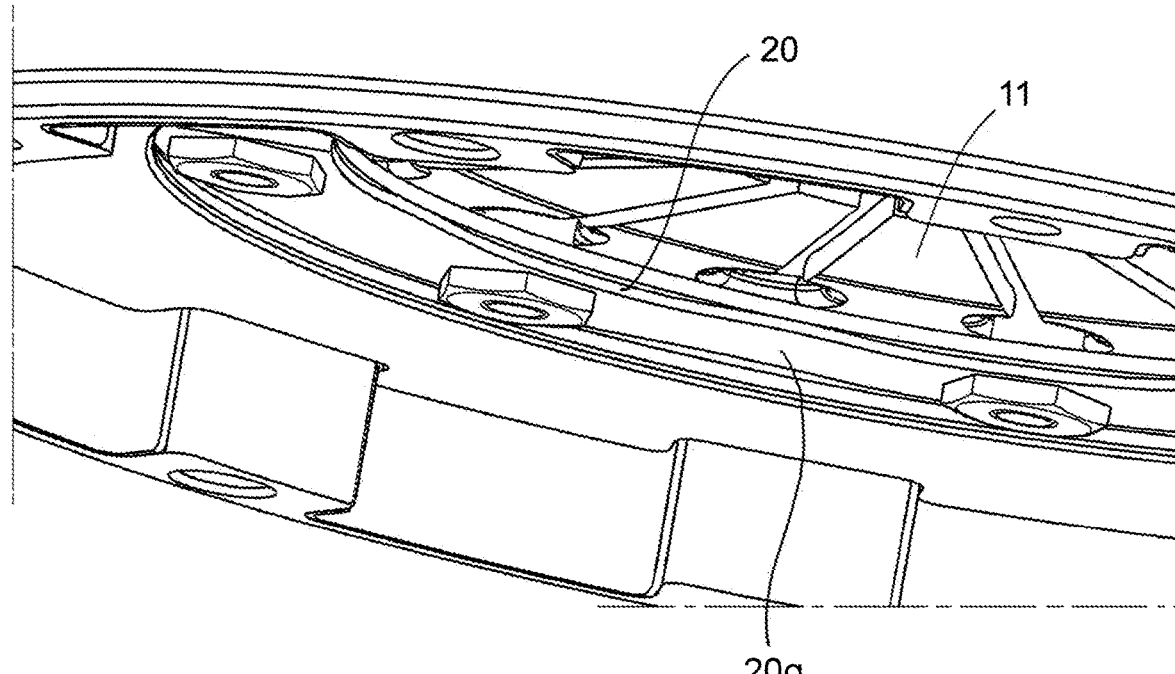
FIG. 14 is a partial perspective view of the friction clutch mechanism of FIG. 13.

In the example of FIGS. 13 and 14, the radially innermost annular portion 20a of the additional elastic element 20 is made in the form of an annular band with a plurality of circumferentially discrete axially elastically compressible portions 20g, preferably in the form of elastically and axially compressible corrugations. The intermediate fulcrum 12 is made as a circumferential bead of a separately formed annular element 21 associated with the additional elastic element 20. The elastically compressible portions 20g elastically contact the lower face of the annular element 21 facing the pressure plate.

Figure 15:
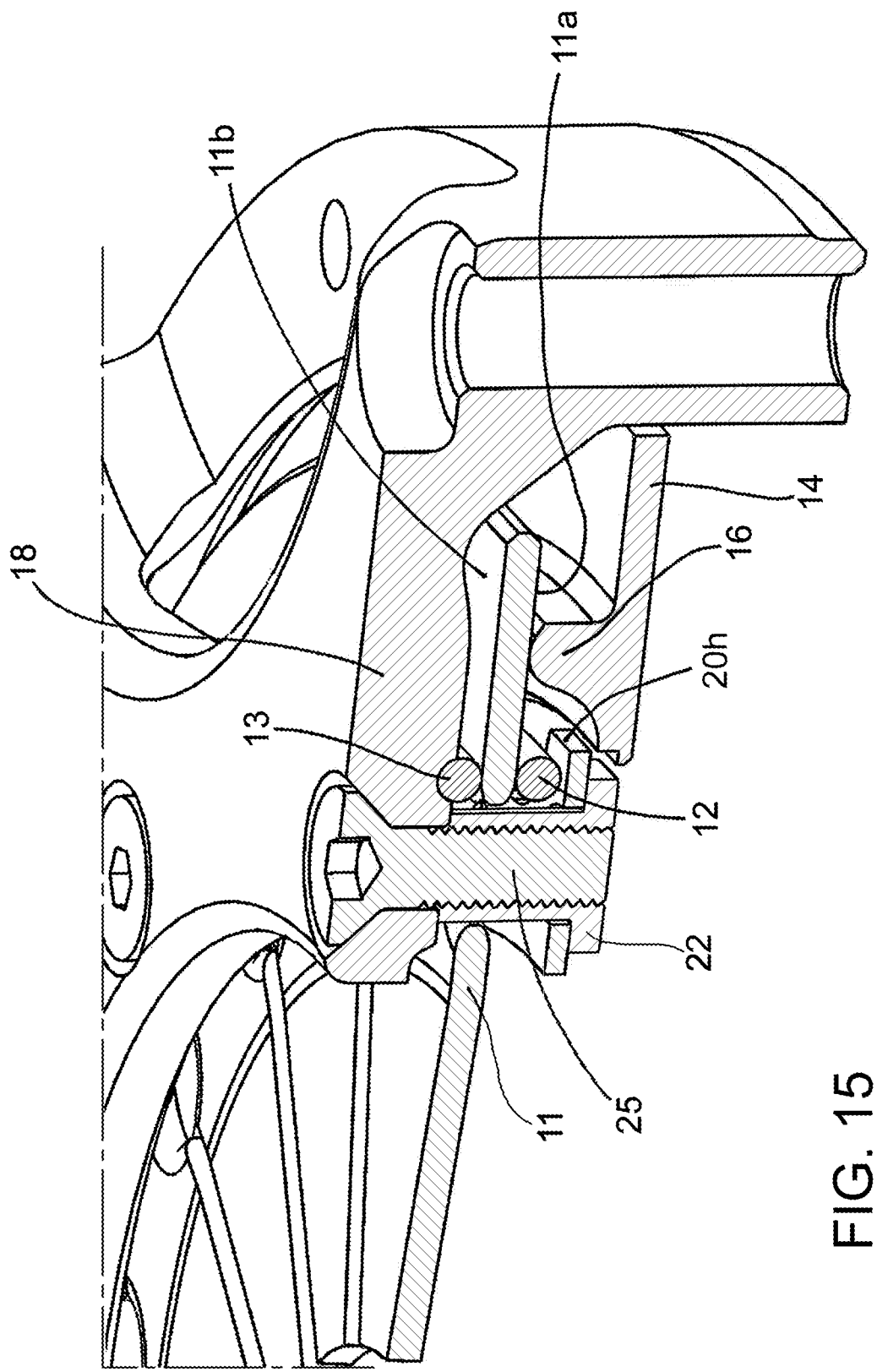
FIG. 15 is a perspective view in partial cutaway of a friction clutch mechanism according to a fifth embodiment of the present invention.
Figure 16:
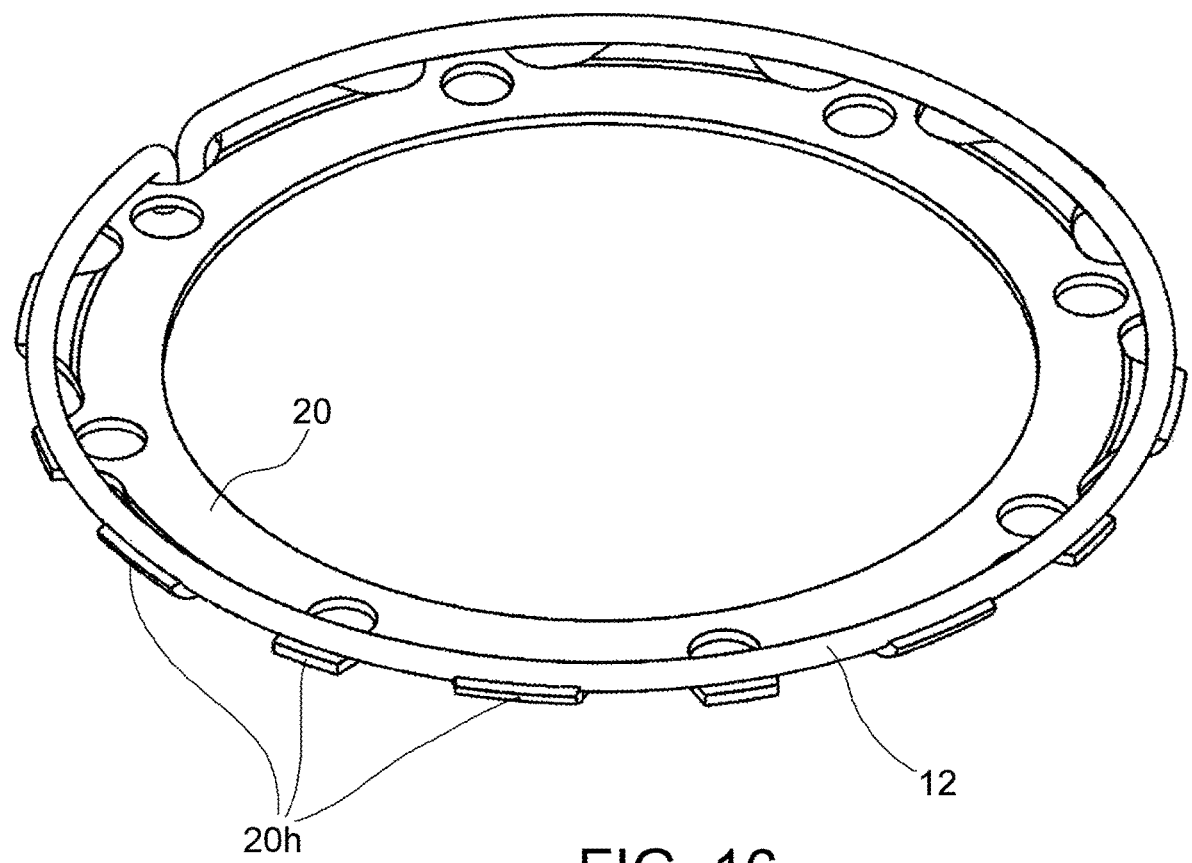
FIG. 16 is a perspective view of two components of the mechanism of FIG. 15.
Figure 17:
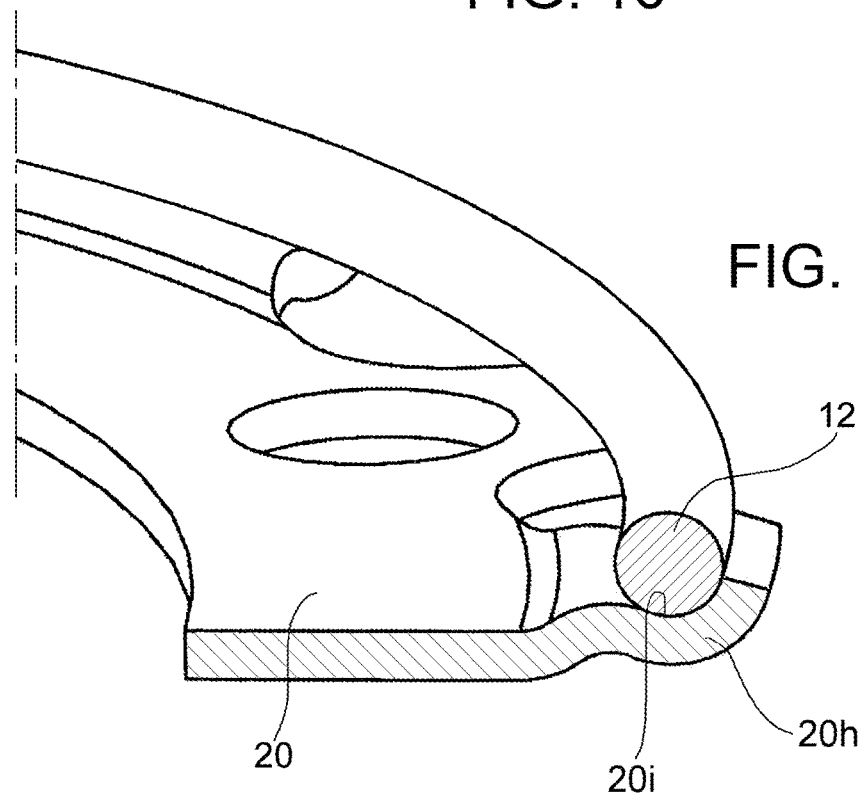
FIG. 17 is a perspective view in partial cutaway and enlarged scale of the components of FIG. 16.

According to the embodiment illustrated in FIGS. 15-17, the additional elastic element 20 may be implemented as a single flexible annular element having a plurality of radially outer elastically flexible tongues or protrusions 20h angularly equally spaced about the central axis A of the diaphragm spring 11. At least some of the flexible tongues 20h define a concave seat 20i (FIG. 17) facing axially towards the diaphragm spring 11. The concave seats 20i together support a toroidal ring 12 axially projecting from the tongues 20h towards the diaphragm spring 11. The toroidal ring 12 serves as the first intermediate fulcrum. The diaphragm spring 11, flexing downwardly against the toroidal ring 12, deflects the tongues 20h in axial planes, imparting a desired axial elastic response (or axial stiffness).

As will be appreciated, the provision of an additional elastic element associated with one of the two intermediate fulcrums allows the torque transmissibility to be improved, making it more gradual; this is achieved by calibrating the compliance by selecting an additional spring having an appropriate stiffness (or elastic constant).

While specific embodiments of the invention have been described, it should be understood that the present disclosure is provided for illustrative purposes only and that the present invention is not to be limited in any way by it. Various modifications will be apparent to those skilled in the art in the light of the foregoing examples. The scope of the invention is limited only by the appended claims.

What is claimed is:

1. A friction clutch mechanism for motor vehicles, comprising:
   a diaphragm spring having a first face and a second face opposite the first face,
   a pressure plate with at least one peripheral fulcrum acting against the first face of the diaphragm spring along a radially outer portion thereof,
   a pair of axially opposed intermediate fulcrums, supported by a clutch cover and acting respectively against the first and second faces of the diaphragm spring along a radially intermediate portion thereof,
   an additional axially compressible elastic element operatively associated with a first intermediate fulcrum of said pair of axially opposed intermediate fulcrums located on a side of the pressure plate, wherein the additional elastic element is configured and arranged to be axially elastically compressed in response to a deflection of the diaphragm spring towards an open clutch condition;
   wherein the additional elastic element comprises a single element having an annular disc shape forming a radially innermost annular portion and a radially outermost annular portion, wherein
   the radially innermost annular portion has a flat annular base resting on one or more bearing surfaces supported directly or indirectly by the clutch cover and facing the clutch cover and the first face of the diaphragm spring,
   the radially outermost annular portion cantilevers in a radially outward direction from the radially innermost annular portion, and comprises at least one protrusion circumferentially extended and axially projecting towards the first face of the diaphragm spring to serve as the first intermediate fulcrum, and wherein
   the radially outermost annular portion of the additional elastic element comprises an annular base surface axially spaced from the one or more bearing surfaces.

2. The friction clutch mechanism of claim 1, wherein the one or more bearing surfaces are formed by a plurality of threaded support elements mounted through the clutch cover at circumferentially spaced positions.

3. The friction clutch mechanism of claim 1, wherein the bearing surface for the additional elastic element is presented by a shelf-shaped extension formed as a single piece with the clutch cover.

4. A friction clutch mechanism for motor vehicles, comprising:
   a diaphragm spring having a first face and a second face opposite the first face,
   a pressure plate with at least one peripheral fulcrum acting against the first face of the diaphragm spring along a radially outer portion thereof,
   a pair of axially opposed intermediate fulcrums, supported by a clutch cover and acting respectively against the first and second faces of the diaphragm spring along a radially intermediate portion thereof,
   an additional axially compressible elastic element operatively associated with a first intermediate fulcrum of said pair of axially opposed intermediate fulcrums located on a side of the pressure plate, wherein the additional elastic element is configured and arranged to be axially elastically compressed in response to a deflection of the diaphragm spring towards an open clutch condition;
   wherein the additional elastic element comprises a single element having an annular disc shape forming a radially innermost annular portion and a radially outermost annular portion, wherein
   the radially innermost annular portion has a flat annular base resting on one or more bearing surfaces supported directly or indirectly by the clutch cover and facing the clutch cover and the first face of the diaphragm spring, the radially outermost annular portion cantilevers in a radially outward direction from the radially innermost annular portion, and comprises at least one protrusion circumferentially extended and axially projecting towards the first face of the diaphragm spring to serve as the first intermediate fulcrum, wherein said at least one protrusion comprises at least one bead formed as a single piece with the additional elastic element and axially protruding towards the first face of the diaphragm spring, and wherein said at least one bead extends circumferentially discontinuously along the radially outermost annular portion of said additional elastic element, forming a plurality of radially outer, angularly spaced, elastically flexible tongues.

5. A friction clutch mechanism for motor vehicles, comprising:

a diaphragm spring having a first face and a second face opposite the first face, a pressure plate with at least one peripheral fulcrum acting against the first face of the diaphragm spring along a radially outer portion thereof, a pair of axially opposed intermediate fulcrums, supported by a clutch cover and acting respectively against the first and second faces of the diaphragm spring along a radially intermediate portion thereof, an additional axially compressible elastic element operatively associated with a first intermediate fulcrum of said pair of axially opposed intermediate fulcrums located on a side of the pressure plate, wherein the additional elastic element is configured and arranged to be axially elastically compressed in response to a deflection of the diaphragm spring towards an open clutch condition;

wherein the additional elastic element-comprises an element having an annular disc shape forming a radially innermost annular portion and a radially outermost annular portion, wherein the radially innermost annular portion has a flat annular base resting on one or more bearing surfaces supported directly or indirectly by the clutch cover and facing the clutch cover and the first face of the diaphragm spring, the radially outermost annular portion cantilevers in a radially outward direction from the radially innermost annular portion, and forms a plurality of radially outer elastically flexible tongues that are angularly spaced apart, wherein at least some of the radially outer elastically flexible tongues define a concave seat facing axially towards the diaphragm spring, and wherein the concave seats together support a toroidal ring axially projecting from the radially outer elastically flexible tongues towards the diaphragm spring to serve as the first intermediate fulcrum.

6. A friction clutch mechanism for motor vehicles, comprising:

a diaphragm spring having a first face and a second face opposite the first face, a pressure plate with at least one peripheral fulcrum acting against the first face of the diaphragm spring along a radially outer portion thereof, a pair of axially opposed intermediate fulcrums, supported by a clutch cover and acting respectively against the first and second faces of the diaphragm spring along a radially intermediate portion thereof, an additional axially compressible elastic element operatively associated with a first intermediate fulcrum of said pair of axially opposed intermediate fulcrums located on a side of the pressure plate, wherein the additional elastic element is configured and arranged to be axially elastically compressed in response to a deflection of the diaphragm spring towards an open clutch condition;

wherein the additional elastic element has an annular disc shape and forms a plurality of axially elastically compressible and circumferentially discrete portions, and wherein the first intermediate fulcrum is realized as a circumferential bead of a separate annular element, arranged adjacent to the additional elastic element, whereby the axially elastically compressible and circumferentially discrete portions of the additional elastic element elastically contact a face of the separate annular element facing the pressure plate.

7. The friction clutch mechanism of claim 6, wherein the axially elastically compressible and circumferentially discrete portions comprise elastically and axially compressible corrugations.

* * * * *